United States Patent
Hasselbusch et al.

(10) Patent No.: US 9,115,809 B2
(45) Date of Patent: Aug. 25, 2015

(54) PIN JOINT ASSEMBLY

(75) Inventors: Michael D. Hasselbusch, Metamora, IL (US); Michael T. James, Pekin, IL (US); Jennifer A. Brooks, Germantown Hills, IL (US)

(73) Assignee: Caterpillar Inc., Peoria, IL (US)

( * ) Notice: Subject to any disclaimer, the term of this patent is extended or adjusted under 35 U.S.C. 154(b) by 256 days.

(21) Appl. No.: 12/572,750

(22) Filed: Oct. 2, 2009

(65) Prior Publication Data

US 2010/0209180 A1 Aug. 19, 2010

Related U.S. Application Data

(60) Provisional application No. 61/152,842, filed on Feb. 16, 2009.

(51) Int. Cl.
*F16C 11/06* (2006.01)
*F16J 1/16* (2006.01)
*F16J 15/34* (2006.01)

(52) U.S. Cl.
CPC .......... *F16J 15/344* (2013.01); *Y10T 29/49826* (2015.01); *Y10T 29/49947* (2015.01); *Y10T 403/32861* (2015.01); *Y10T 403/32893* (2015.01); *Y10T 403/32951* (2015.01)

(58) Field of Classification Search
CPC ............... Y10T 403/32861; Y10T 403/32893; F16J 15/344
USPC ......... 403/119, 121, 150, 161–167, 157, 347, 403/288; 277/382, 366–369, 361, 356, 371; 305/102–106, 163–164, 202–204, 59
See application file for complete search history.

(56) References Cited

U.S. PATENT DOCUMENTS

| | | | |
|---|---|---|---|
| 3,180,648 A | 4/1965 | Kupfert et al. | |
| 3,241,843 A | 3/1966 | Hatch et al. | |
| 3,322,431 A | 5/1967 | Solari | |
| 3,463,560 A * | 8/1969 | Dadds et al. | 305/118 |
| 3,540,743 A | 11/1970 | Ashton et al. | |
| 3,985,366 A * | 10/1976 | Plouzek | 277/382 |
| 4,189,159 A | 2/1980 | Domes et al. | |
| 4,351,533 A | 9/1982 | Moore | |
| 4,844,483 A | 7/1989 | Iijima et al. | |
| 5,769,557 A | 6/1998 | Beals et al. | |
| 6,092,809 A * | 7/2000 | Keifer et al. | 277/390 |
| 6,382,742 B1 * | 5/2002 | Hasselbusch et al. | 305/102 |
| 6,485,116 B1 | 11/2002 | Oertley | |
| 7,121,555 B2 | 10/2006 | Yamamoto | |
| 7,309,186 B2 | 12/2007 | Oertley | |
| 7,374,257 B2 | 5/2008 | Oertley | |
| 7,736,117 B2 * | 6/2010 | Harshberger et al. | 414/686 |
| 7,744,169 B2 * | 6/2010 | Murakami et al. | 305/105 |

(Continued)

*Primary Examiner* — Michael P Ferguson
*Assistant Examiner* — Nahid Amiri
(74) *Attorney, Agent, or Firm* — Finnegan, Henderson, Farabow, Garrett & Dunner, LLP

(57) ABSTRACT

A pin joint assembly including a pin defining a longitudinal axis and having an end portion, a bushing coaxial with the pin about the longitudinal axis and having an end portion, and a collar engaging the end portion of the pin and having an inner portion in proximal relation to the end portion of the bushing and an outer portion in distal relation to the end portion of the bushing. The end portion of the bushing, the inner portion of the collar, and the pin cooperate to define a channel. The pin joint assembly further includes a thrust ring coaxial with the pin about the longitudinal axis and residing in the channel in spaced-apart relation to the bushing.

23 Claims, 3 Drawing Sheets

(56) References Cited

U.S. PATENT DOCUMENTS

| | | |
|---|---|---|
| 2006/0275074 A1 | 12/2006 | Guinard et al. |
| 2007/0193406 A1* | 8/2007 | Kabir et al. ............ 74/598 |
| 2009/0110472 A1 | 4/2009 | Liang et al. |
| 2009/0110530 A1* | 4/2009 | Harshberger et al. ......... 414/686 |
| 2009/0243384 A1* | 10/2009 | Diekevers et al. ............ 305/202 |

* cited by examiner

PIN JOINT ASSEMBLY

TECHNICAL FIELD

This invention generally relates to a pin joint assembly for machinery and equipment.

BACKGROUND

Pin joints are employed on many types of residential and industrial machinery and equipment, for instance to provide pivot points between adjoining components. Most pin joints include various assemblies and structures intended to help prevent premature breakage or wear, for instance components that define chambers for holding lubricant. However, radial and axial loads endured by pin joints can be extreme, causing high mechanical and thermal stress and strain of pin joint assemblies. Such stress and strain can not only cause component breakage and wear, it can cause leakage or release of lubricant, which in turn can lead to further component breakage and wear as well as environmental pollution. In fact, some machinery and equipment are even designed to regularly pump fresh lubricant into pin joints in order to replace continually leaking lubricant. As demands on pin joint assemblies increase in succeeding generations of machinery and equipment, more robust pin joint assembly designs are needed.

U.S. Pat. No. 7,309,186 to Oertley ("Oertley '186"), which, like the present application and invention, is assigned to Caterpillar Inc., discloses a pin cartridge for a pin joint. Specifically, Oertley '186 describes a pin cartridge assembly that includes a pin, a bushing, a collar at each end of the pin, and a sleeve bearing between each end of the bushing and the pin. Two-element seals known to those of ordinary skill in the art as "can and lip" seals help retain lubricant in the pin cartridge.

SUMMARY

A pin joint assembly including a pin defining a longitudinal axis and having an end portion, a bushing coaxial with the pin about the longitudinal axis and having an end portion, and a collar engaging the end portion of the pin and having an inner portion in proximal relation to the end portion of the bushing and an outer portion in distal relation to the end portion of the bushing. The end portion of the bushing, the inner portion of the collar, and the pin cooperate to define a channel. The pin joint assembly further includes a thrust ring coaxial with the pin about the longitudinal axis and residing in the channel in spaced-apart relation to the bushing.

A pin joint assembly including a pin defining a longitudinal axis and having an end portion, a bushing coaxial with the pin about the longitudinal axis and having an end portion, a collar engaging the end portion of the pin and having an inner portion in proximal relation to the end portion of the bushing and an outer portion in distal relation to the end portion of the bushing, a seal having first and second seal rings and first and second gaskets, the first and second seal rings abutting one another, the first gasket engaging and separating the collar and the first seal ring, and the second gasket engaging and separating the bushing and the second seal ring. The end portion of the bushing, the inner portion of the collar, and the pin cooperate to define a channel. The pin joint assembly further includes a thrust ring coaxial with the pin about the longitudinal axis and residing in the channel in spaced-apart relation to the bushing.

A pin joint assembly including a pin defining a longitudinal axis and having an end portion, a bushing coaxial with the pin about the longitudinal axis and having an end portion, a sleeve bearing engaging the pin and the end portion of the bushing, a collar engaging the end portion of the pin and having an inner portion in proximal relation to the end portion of the bushing and an outer portion in distal relation to the end portion of the bushing, a seal having first and second seal rings and first and second gaskets, the first and second seal rings abutting one another, the first gasket engaging and separating the collar and the first seal ring, and the second gasket engaging and separating the bushing and the second seal ring. The end portion of the bushing, the inner portion of the collar, and the pin cooperate to define a channel. The pin joint assembly further includes a thrust ring coaxial with the pin about the longitudinal axis and residing in the channel in spaced-apart relation to the bushing.

DETAILED DESCRIPTION

Figure 1:
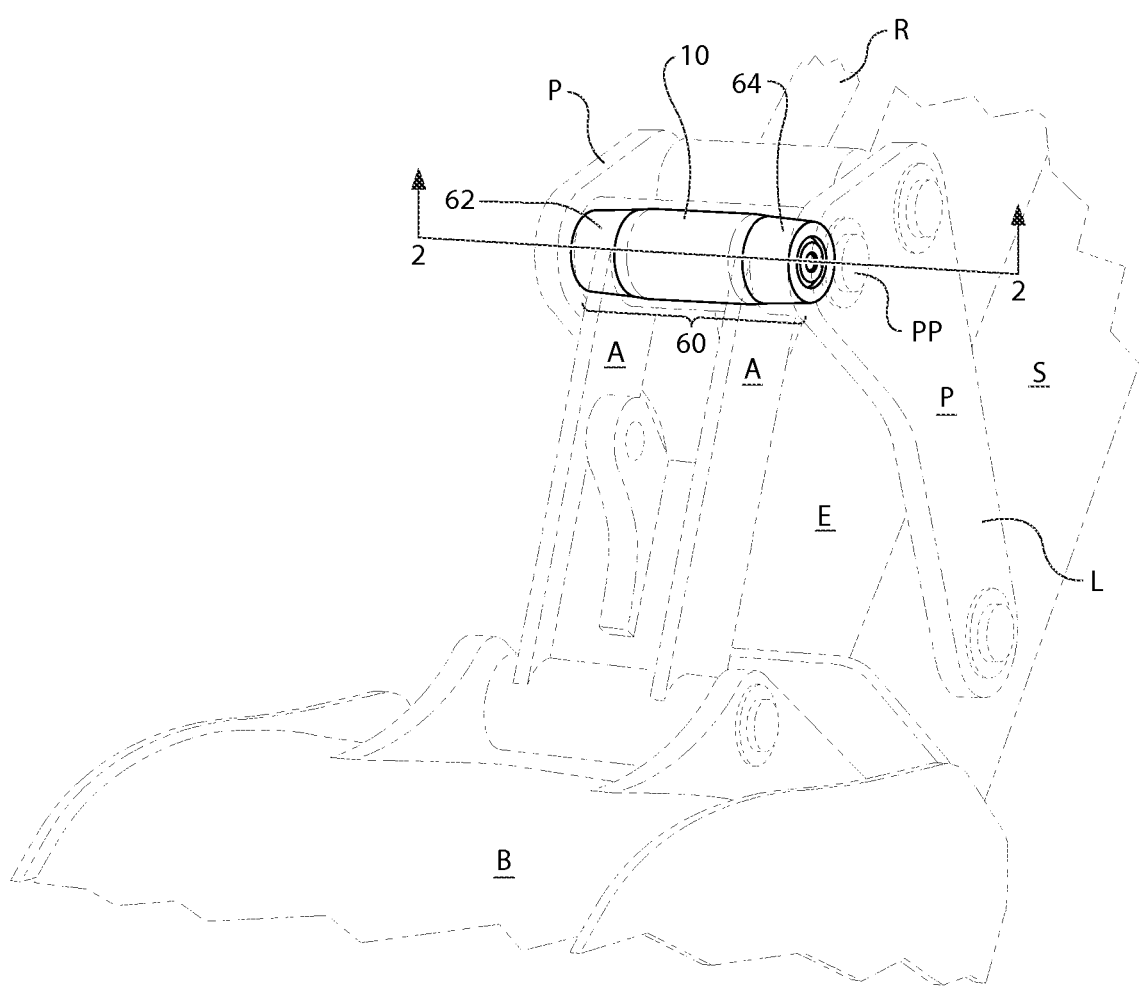
FIG. 1 is a fragmentary isometric view of a machine with a linkage having a pivot point, all shown in phantom, together with a pin joint assembly installed at the pivot point, the pin joint assembly being in accord with an embodiment of the invention.

A pin joint assembly according to an embodiment of the invention is shown broadly in FIG. 1 at reference numeral 10. By way of example and not by way of limitation, the pin joint assembly 10 is shown installed on an excavator "E" at a pivot point "PP" of a linkage "L" between a stick "S" and a bucket "B". More specifically, in the illustrated example the pin joint assembly 10 helps enable plates "P" coupled to the stick "S" to move in conjunction with arms "A" coupled to the bucket "B". The overall linkage "L" enables movement of the bucket "B" by a rod "R" of a hydraulic cylinder (not shown) mounted on the stick "S".

Figure 2:
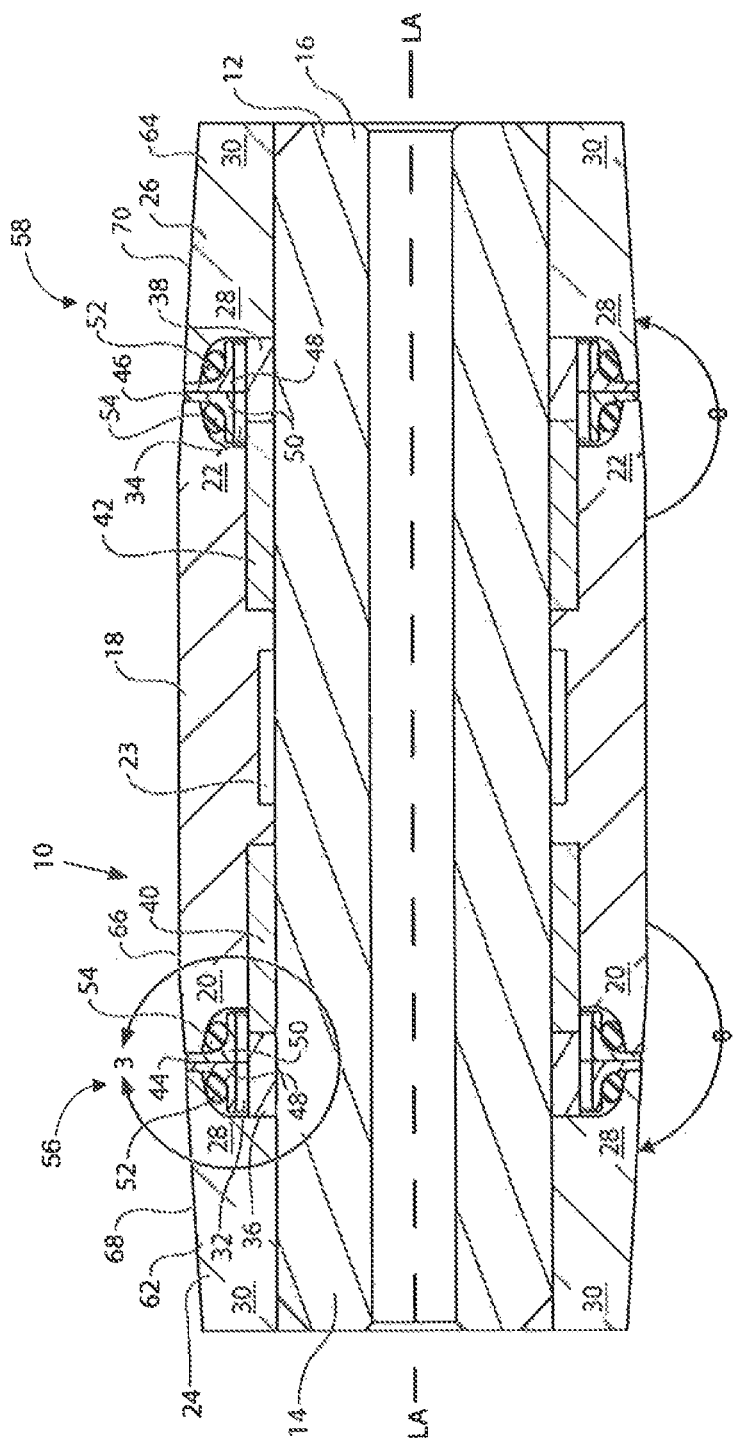
FIG. 2 is a cross-sectional view of the pin joint assembly shown in FIG. 1, taken through line 2-2 in FIG. 1.

Turning now to FIG. 2, the pin joint assembly 10 is shown in cross-section. The pin joint assembly 10 includes a pin 12 with first and second end portions 14, 16 opposite one another and a bushing 18 with first and second end portions 20, 22 opposite one another. The pin 12 defines a longitudinal axis "LA" and the bushing 18 is coaxial with the pin 12 about the longitudinal axis "LA". The bushing 18 defines a substantially centrally disposed void 23 for receiving lubricant (not shown). The pin joint assembly 10 further includes first and second collars 24, 26 engaging the first and second end portions 14, 16 of the pin 12, respectively. The first and second collars 24, 26 each have an inner portion 28 and an outer portion 30. The inner portions 28 of the first and second collars 24, 26 are oriented in proximal relation to the first and second end portions 20, 22 of the bushing 18, respectively, and the outer portions 30 of the first and second collars 24, 26 are oriented in distal relation to the first and second end portions 20, 22 of the bushing 18, respectively.

The first end portion 20 of the bushing 18, the inner portion 28 of the first collar 24, and the pin 12 cooperate to define a substantially annular first channel 32 for receiving lubricant (not shown). Similarly, the second end portion 22 of the bushing, the inner portion 28 of the second collar 26, and the pin 12 cooperate to define a substantially annular second channel 34, also for receiving lubricant (not shown). First and second thrust rings 36, 38 that are coaxial with the pin 12 about the longitudinal axis "LA" reside in the first and second channels 32, 34, respectively. The thrust rings 36, 38 are oriented in spaced-apart relation relative to the bushing 18. First and second sleeve bearings 40, 42 that are coaxial with the pin 12 about the longitudinal axis "LA" engage the first and second end portions 20, 22 of the bushing 18, respectively, and also engage the pin 12. The first thrust ring 36 engages the pin 12 between the inner portion 28 of the first collar 24 and the first sleeve bearing 40, while the second thrust ring 38 engages the pin 12 between the inner portion 28 of the second collar 26 and the second sleeve bearing 42. The first and second thrust rings 36, 38 may also intermittently or continuously engage the first and second sleeve bearings 40, 42 during use of the pin joint assembly 10.

Figure 3:
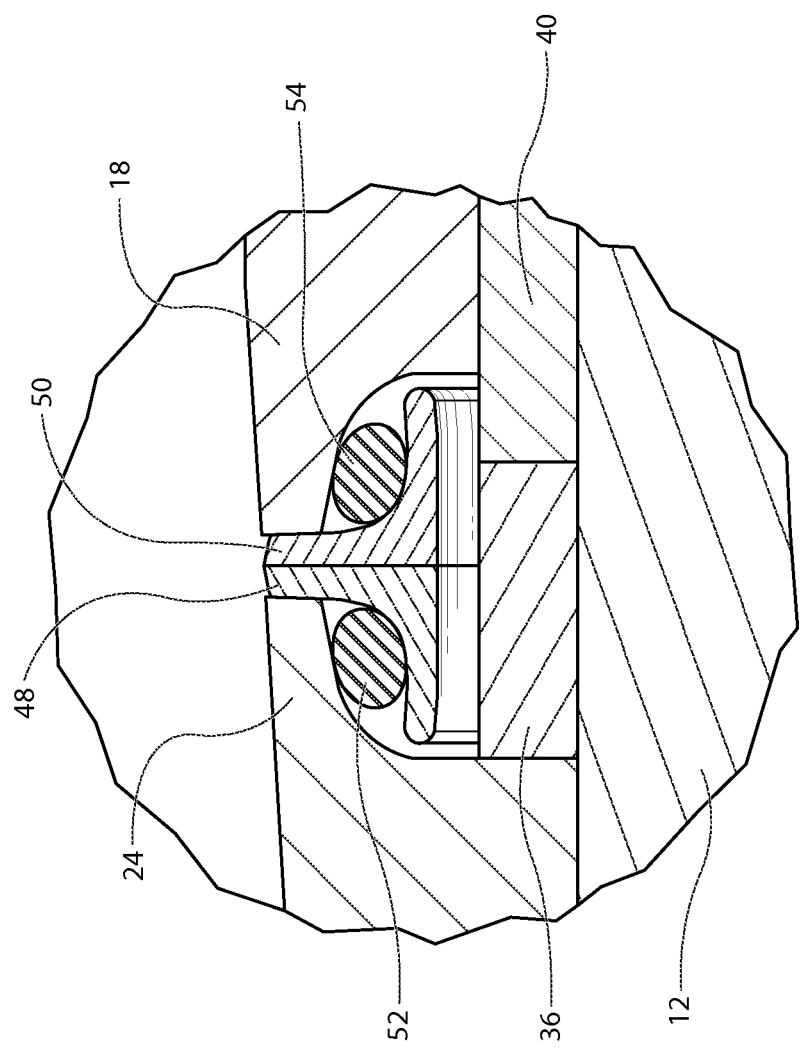
FIG. 3 is a detail of FIG. 2 encompassed by arc 3 in FIG. 2.

Looking now at FIG. 3, itself a detail from FIG. 2, the pin joint assembly 10 further includes first and second metal-to-metal face seals 44, 46, each having first and second seal rings 48, 50 and first and second gaskets 52, 54. The first and second seal rings 48, 50 in each of the seals 44, 46 abut one another. Further, in the first seal 44, the first gasket 52 engages and seals the first collar 24 with the first seal ring 48, and the second gasket 54 engages and seals the bushing 18 with the second seal ring 50. Similarly, in the second seal 46, the first gasket 52 engages and seals the second collar 26 with the first seal ring 48, and the second gasket 54 engages and seals the bushing 18 with the second seal ring 50.

The first collar 24, the first thrust ring 36, the first sleeve bearing 40, and the first seal 44 comprise a first subassembly 56 of the pin joint assembly 10, while the second collar 26, the second thrust ring 38, the second sleeve bearing 42, and the second seal 46 comprise a second subassembly 58 of the pin joint assembly 10. Depending on the application and environment in which the pin joint assembly 10 is employed, the pin joint assembly 10 may require only one of the subassemblies 56, 58, in which case only one of the end portions of the pin 12 and only the corresponding end portion of the bushing 18 are provided with a subassembly—that is, at least a collar, a thrust ring, a sleeve bearing, and a seal. In such instances, the opposing end portion of the pin 12 and the end portion of the bushing 18 in proximal relation to the opposing end portion of the pin 12, not being provided with all elements of a subassembly, may be provided with no elements of a subassembly or some elements of a subassembly. For instance, by way of example and not by way of limitation, if the first end portion 14 of the pin 12 and the first end portion 20 of the bushing 18 are provided with the first subassembly 56, the second end portion 16 of the pin 12 and the second end portion 22 of the bushing 18 may be provided with only the second sleeve bearing 42 and the second seal 46, thereby omitting the second collar 26 and the second thrust ring 38. As the pin joint assembly 10 is only shown with both the first and second subassemblies 56, 58, this latter example is not shown.

The pin joint assembly 10, including the pin 12, the bushing 28, and the subassemblies 56, 58, may also be provided in a unitary cartridge 60 as shown in FIG. 1 in order to ease maintenance and/or replacement of the pin joint assembly 10. The cartridge 60 is substantially cylindrical but tapers in outer diameter at each end portion 62, 64 of the pin joint assembly 10. Specifically, as shown in FIG. 2, at each of the end portions 62, 64 of the pin joint assembly 10, an outer surface 66 of the bushing 18 cooperates with an outer surface 68, 70 of each of the first and second collars 24, 26, respectively, to define an angle "θ" measuring approximately 3.25 radians (186 degrees). The angle "θ" helps ensure secure installation of the cartridge 60 between the arms "A" and the corresponding plates "P" of the linkage "L" (FIG. 1). The angle "θ" could be smaller or larger than 3.25 radians without detracting from the function of the pin joint assembly 10; by way of example and not by way of limitation, the angle "θ" could measure within an inclusive range of approximately 3.23 to approximately 3.32 radians (approximately 185 to 190 degrees). The tapered outer diameter of the cartridge 60 is provided to enable the cartridge 60 to be installed by swaging, but any alternative structures or features that enable secure installation of the cartridge 60 may be utilized.

INDUSTRIAL APPLICABILITY

Though the pin joint assembly 10 is illustrated in FIG. 1 within the context of the linkage "L" at the pivot point "PP" defined by the stick "S" and the bucket "B" of the excavator "E", the pin joint assembly 10 may be employed in order to facilitate articulation of one or more hardware structures within any linkage on any machine.

During use, the pin 12 of the pin joint assembly 10 is held stationary by the first and second collars 24, 26. The bushing 18 rotates about the longitudinal axis "LA" while engaging the pin 12 and the first and second sleeve bearings 40, 42. The first and second sleeve bearings 40, 42, in turn, rotate about the longitudinal axis "LA" while engaging the bushing 18 and the pin 12. The interposition of the first and second sleeve bearings 40, 42 between the bushing 18 and the pin 12 provides two pairs of hardware interfaces, namely a pair of bushing-to-sleeve-bearing interfaces and a pair of sleeve-bearing-to-pin interfaces. As a result, if any particular hardware interface that enables rotation of the bushing 18 loses lubrication, thereby resulting in full or partial seizing of the interface, the remaining, unseized hardware interfaces will help enable the bushing 18 to continue rotating. In this way, the various hardware interfaces provide redundancy to help enable the rotation of the bushing 18 demanded during routine use of the pin joint assembly 10.

The pin joint assembly 10 endures radial loads during use, as well as axial loads along or in substantially parallel relation to the longitudinal axis "LA". While the sleeve bearings 40, 42 help the pin joint assembly 10 bear radial loads, the first and second thrust rings 36, 38 help the pin joint assembly 10 bear axial loads. Specifically, during use, the thrust rings 36, 38 slide along the pin 12 and/or compress and decompress in reaction to axial loads, thereby dampening axial loads and, by extension, helping to reduce wear of the pin joint assembly 10 caused by axial loads. The thrust rings 36, 38 reside wholly within the channels 32, 34, respectively, and as a result are better enabled to move as necessary to bring about such dampening. Further, the sleeve bearings 40, 42 extend beyond the bushing 18 into the channels 32, 34, respectively, thereby spacing the thrust rings 36, 38 apart from the bushing 18 in order to help prevent the rotation of the bushing 18 from interfering with the movement and/or compression and decompression of the thrust rings 36, 38 during use of the pin joint assembly 10.

The first and second seals 44, 46 help prevent lubricant (not shown) from leaking out of the channels 32, 34, respectively. Specifically, the first and second seal rings 48, 50 of each of the seals 44, 46 rotate against one another, thereby imparting mechanical pressure against the corresponding gaskets 52, 54. The mechanical pressure from the seal rings 48, 50 compresses the first gasket 52 of each seal 44, 46 against the corresponding collar 24, 26 and compresses the second gasket 54 of each seal 44, 46 against the corresponding end portion 20, 22 of the bushing 18. Accordingly, lubricant (not shown) is restrained from escaping the channels 32, 34 and the subassemblies 56, 58 maintain lubrication for a longer period of time and experience less wear.

Test results have demonstrated this increase in the life of the subassemblies 56, 58 and of the pin joint assembly 10 in general. Specifically, the assignee of the present application conducted and/or oversaw tests comparing the performance of a pin joint assembly manufactured substantially in accordance with the design disclosed in Oertley '186 ("the prior art pin joint assembly") with the performance of a pin joint assembly manufactured substantially in accordance with the design disclosed herein ("the subject pin joint assembly"). While employed in a linkage on a wheel loader, the prior art pin joint assembly began leaking after 7,373 hours of operation. Upon examination, a load ring in the prior art pin joint assembly (the "can" of the "can-and-lip" design) had been torn, cracked, and abraded and the seals (the "lips" of the "can-and-lip" design) had worn 20-25%. Further, an end collar in the prior art pin joint assembly had severe thrust wear 10 mm in width and over 1 mm in depth. When tested in a similar setting, the subject pin joint assembly was removed and examined after 11,000 hours of operation. After removal, the subject pin joint assembly passed a leak test of 20 psi. Further, none of the seal rings 48, 50 showed any evidence of cracking, ripping, rolling, or tearing, and the properties of the seal rings 48, 50 appeared to remain substantially unchanged with additional operating hours. In addition, the gaskets 52, 54 had no sign of significant wear. These unexpected results demonstrate the significantly increased durability provided by the subject pin joint assembly over the prior art pin joint assembly.

A pin joint assembly is disclosed. The specific embodiments disclosed herein are for purposes of illustration only and not for purposes of limitation. Significant changes could be made to the specific embodiments disclosed herein without departing from the scope of the invention, as the scope of the invention is dictated only by the language of the claims.

What is claimed is:

1. A pin joint assembly, comprising:
   a pin defining a longitudinal axis and including a first end portion and a second end portion opposite the first end portion;
   a cylindrical bushing coaxial with the pin about the longitudinal axis and including a first end portion and a second end portion opposite the first end portion;
   a first collar engaging the first end portion of the pin and including an inner portion in proximal relation to the first end portion of the bushing and an outer portion in distal relation to the first end portion of the bushing;
   a second collar engaging the second end portion of the pin and including an inner portion in proximal relation to the second end portion of the bushing and an outer portion in distal relation to the second end portion of the bushing;
   the first end portion of the bushing, the inner portion of the first collar, and the pin cooperating to define a first channel;
   a first thrust ring coaxial with the pin about the longitudinal axis and residing in the first channel in an axially spaced-apart relation to the bushing;
   the second end portion of the bushing, the inner portion of the second collar, and the pin cooperating to define a second channel; and
   a second thrust ring coaxial with the pin about the longitudinal axis and residing in the second channel in an axially spaced-apart relation to the bushing,
   wherein an outer surface of the bushing cooperates with an outer surface of each of the first and second collars to define an angle ranging from 185° to 190°, such that the first and second end portions of the bushing and the first and second collars are tapered and provide clearance during installation of the pin joint assembly.

2. The pin joint assembly of claim 1, further comprising a first seal separating the first end portion of the bushing and the inner portion of the first collar from one another, and a second seal separating the second end portion of the bushing and the inner portion of the second collar from one another.

3. The pin joint assembly of claim 2, wherein each of the first and second seals comprises first and second seal rings and first and second gaskets.

4. The pin joint assembly of claim 1, further comprising a first sleeve bearing engaging the pin and the first end portion of the bushing, and a second sleeve bearing engaging the pin and the second end portion of the bushing.

5. The pin joint assembly of claim 4, wherein the first thrust ring engages the pin between the inner portion of the first collar and the first sleeve bearing, and the second thrust ring engages the pin between the inner portion of the second collar and the second sleeve bearing.

6. The pin joint assembly of claim 1, wherein the pin joint assembly is a unitary cartridge comprising the pin, the bushing, the first and second collars, and the first and second thrust rings.

7. The pin joint assembly of claim 1, further comprising:
   a first end subassembly including the first collar, the first thrust ring, and defining the first channel, and
   a second end subassembly including the second collar, the second thrust ring, and defining the second channel;
   the first end subassembly being oriented adjacent to the first end portion of the pin and the first end portion of the bushing and the second end subassembly being oriented adjacent to the second end portion of the pin and the second end portion of the bushing.

8. The pin joint assembly of claim 7, wherein the first end subassembly further comprises a first seal separating the first end portion of the bushing and the inner portion of the first collar from one another and the second end subassembly further comprises a second seal separating the second end portion of the bushing and the inner portion of the second collar from one another.

9. The pin joint assembly of claim 8, wherein each of the first and second seals comprises first and second seal rings and first and second gaskets.

10. The pin joint assembly of claim 7, wherein the first end subassembly further comprises a first sleeve bearing engaging the pin and the first end portion of the bushing and the second end subassembly further comprises a second sleeve bearing engaging the pin and the second end portion of the bushing.

11. The pin joint assembly of claim 1, wherein the first thrust ring resides in the first channel in non-contacting relation to the bushing, and the second thrust ring resides in the second channel in non-contacting relation to the bushing.

12. A pin joint assembly, comprising:
   a pin defining a longitudinal axis and including a first end portion and a second end portion opposite the first end portion;
   a cylindrical bushing coaxial with the pin about the longitudinal axis and including a first end portion and a second end portion opposite the first end portion;
   a first collar engaging the first end portion of the pin and including an inner portion in proximal relation to the first end portion of the bushing and an outer portion in distal relation to the first end portion of the bushing;
   a second collar engaging the second end portion of the pin and including an inner portion in proximal relation to the second end portion of the bushing and an outer portion in distal relation to the second end portion of the bushing;
   a first seal comprising first and second seal rings and first and second gaskets, the first and second seal rings abutting one another, the first gasket engaging and separating the first collar and the first seal ring, and the second gasket engaging and separating the bushing and the second seal ring;

a second seal comprising third and fourth seal rings and third and fourth gaskets, the third and fourth seal rings abutting one another, the third gasket engaging and separating the second collar and the third seal ring, and the fourth gasket engaging and separating the bushing and the fourth seal ring;

the first end portion of the bushing, the inner portion of the first collar, and the pin cooperating to define a first channel;

a first thrust ring coaxial with the pin about the longitudinal axis and residing in the first channel in an axially spaced-apart relation to the bushing;

the second end portion of the bushing, the inner portion of the second collar, and the pin cooperating to define a second channel; and a second thrust ring coaxial with the pin about the longitudinal axis and residing in the second channel in an axially spaced-apart relation to the bushing, wherein an outer surface of the bushing cooperates with an outer surface of each of the first and second collars to define an angle ranging from 185° to 190°, such that the first and second end portions of the bushing and the first and second collars are tapered and provide clearance during installation of the pin joint assembly.

13. The pin joint assembly of claim 12, further comprising a first sleeve bearing engaging the pin and the first end portion of the bushing, and a second sleeve bearing engaging the pin and the second end portion of the bushing.

14. The pin joint assembly of claim 13, wherein the first thrust ring engages the pin between the inner portion of the first collar and the first sleeve bearing, and the second thrust ring engages the pin between the inner portion of the second collar and the second sleeve bearing.

15. The pin joint assembly of claim 12, wherein the pin joint assembly is a unitary cartridge comprising the pin, the bushing, the first and second collars, the first and second seals, and the first and second thrust rings.

16. The pin joint assembly of claim 12, further comprising:
a first end subassembly including the first collar, the first seal, the first thrust ring, and defining the first channel, and
a second end subassembly including the second collar, the second seal, the second thrust ring, and defining the second channel;
the first end subassembly being oriented adjacent to the first end portion of the pin and the first end portion of the bushing and the second end subassembly being oriented adjacent to the second end portion of the pin and the second end portion of the bushing.

17. The pin joint assembly of claim 16, wherein the first end subassembly further comprises a first sleeve bearing engaging the pin and the first end portion of the bushing and the second end subassembly further comprises a second sleeve bearing engaging the pin and the second end portion of the bushing.

18. The pin joint assembly of claim 17, the first thrust ring engages the pin between the inner portion of the first collar and the first sleeve bearing, and the second thrust ring engages the pin between the inner portion of the second collar and the second sleeve bearing.

19. The pin joint assembly of claim 12, wherein the first thrust ring resides in the first channel in non-contacting relation to the bushing, and the second thrust ring resides in the second channel in non-contacting relation to the bushing.

20. A pin joint assembly, comprising:
a pin defining a longitudinal axis and including a first end portion and a second end portion opposite the first end portion;
a cylindrical bushing coaxial with the pin about the longitudinal axis and including a first end portion and a second end portion opposite the first end portion;
a first sleeve bearing engaging the pin and the first end portion of the bushing;
a second sleeve bearing engaging the pin and the second end portion of the bushing;
a first collar engaging the first end portion of the pin and including an inner portion in proximal relation to the first end portion of the bushing and an outer portion in distal relation to the first end portion of the bushing;
a second collar engaging the second end portion of the pin and including an inner portion in proximal relation to the second end portion of the bushing and an outer portion in distal relation to the second end portion of the bushing;
a first seal comprising first and second seal rings and first and second gaskets, the first and second seal rings abutting one another, the first gasket engaging and separating the first collar and the first seal ring, and the second gasket engaging and separating the bushing and the second seal ring;
a second seal comprising third and fourth seal rings and third and fourth gaskets, the third and fourth seal rings abutting one another, the third gasket engaging and separating the second collar and the third seal ring, and the fourth gasket engaging and separating the bushing and the fourth seal ring;
the first end portion of the bushing, the inner portion of the first collar, and the pin cooperating to define a first channel;
a first thrust ring coaxial with the pin about the longitudinal axis and residing in the first channel in an axially spaced-apart relation to the bushing;
the second end portion of the bushing, the inner portion of the second collar, and the pin cooperating to define a second channel; and
a second thrust ring coaxial with the pin about the longitudinal axis and residing in the second channel in an axially spaced-apart relation to the bushing,
wherein an outer surface of the bushing cooperates with an outer surface of each of the first and second collars to define an angle ranging from 185° to 190°, such that the first and second end portions of the bushing and the first and second collars are tapered and provide clearance during installation of the pin joint assembly.

21. The pin joint assembly of claim 20, wherein the first thrust ring engages the pin between the inner portion of the first collar and the first sleeve bearing, and the second thrust ring engages the pin between the inner portion of the second collar and the second sleeve bearing.

22. The pin joint assembly of claim 21, wherein the pin, the bushing, the first and second sleeve bearings, the first and second collars, the first and second seals, and the first and second thrust rings form a unitary cartridge.

23. The pin joint assembly of claim 20, wherein the first thrust ring resides in the first channel in non-contacting relation to the bushing, and the second thrust ring resides in the second channel in non-contacting relation to the bushing.

* * * * *